United States Patent
Shinohara

(10) Patent No.: US 6,977,677 B1
(45) Date of Patent: Dec. 20, 2005

(54) IMAGING APPARATUS WITH VIDEO DATA TRANSMISSION

(75) Inventor: Toshiaki Shinohara, Oomiya (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/401,853

(22) Filed: Sep. 22, 1999

(30) Foreign Application Priority Data

Sep. 28, 1998 (JP) .......................... 10-274011

(51) Int. Cl.[7] ............................................ H04N 5/232
(52) U.S. Cl. .................... 348/211.5; 348/512
(58) Field of Search ................ 348/207.1, 207.11, 348/211.5, 211.4, 500, 510, 512, 513, 525, 516

(56) References Cited

U.S. PATENT DOCUMENTS

| | | | | |
|---|---|---|---|---|
| 4,626,898 A | * | 12/1986 | Baba et al. | 348/279 |
| 4,951,143 A | * | 8/1990 | Waehner | 348/513 |
| 5,483,290 A | * | 1/1996 | Ohtsubo et al. | 348/516 |
| 5,608,490 A | | 3/1997 | Ogawa | |
| 6,493,025 B1 | * | 12/2002 | Kiriyama et al. | 348/207.1 |
| 6,686,958 B1 | * | 2/2004 | Watanabe et al. | 348/207.1 |
| 6,795,124 B1 | * | 9/2004 | Gamo et al. | 348/525 |

FOREIGN PATENT DOCUMENTS

| | | |
|---|---|---|
| EP | 0522794 | 1/1993 |
| EP | 0740475 | 10/1996 |
| EP | 0777381 | 6/1997 |
| JP | 9-130655 | 5/1997 |

* cited by examiner

Primary Examiner—Thai Tran
Assistant Examiner—Jason Whipkey
(74) Attorney, Agent, or Firm—Louis Woo

(57) ABSTRACT

A communication circuit transmits the digital video signal to a transmission line and receives a clock signal and timing data transmitted through the transmission line. The timing data indicates a communication timing. A timing signal generation circuit generates timing signals from the detected clock signal to control the imager, the a/d converting circuit, the signal processing circuit, and the communication circuit. A communication control circuit detects a communication timing from the timing data, judges whether the communication timing is detected within a predetermined condition (communication error), and controls the timing signal generation circuit to stop transmitting the digital video signal when the communication timing is not detected within the predetermined condition to prevent a fail in transmitting the video data. A shutter interval of the imager is further controlled toward a constant shutter interval in response to the communication error. The video signal is stored in a memory in response to the communication error and read if the communication error eliminated. The communication error is displayed. A system control signal indicative of data transmission period is generated in response to a received cycle start packet in accordance with the obtained data rate and channel timing.

15 Claims, 13 Drawing Sheets

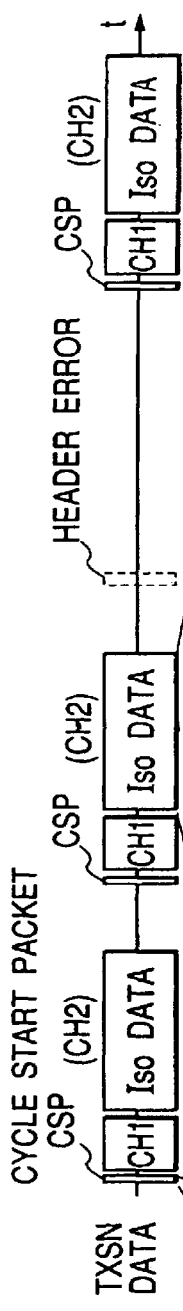
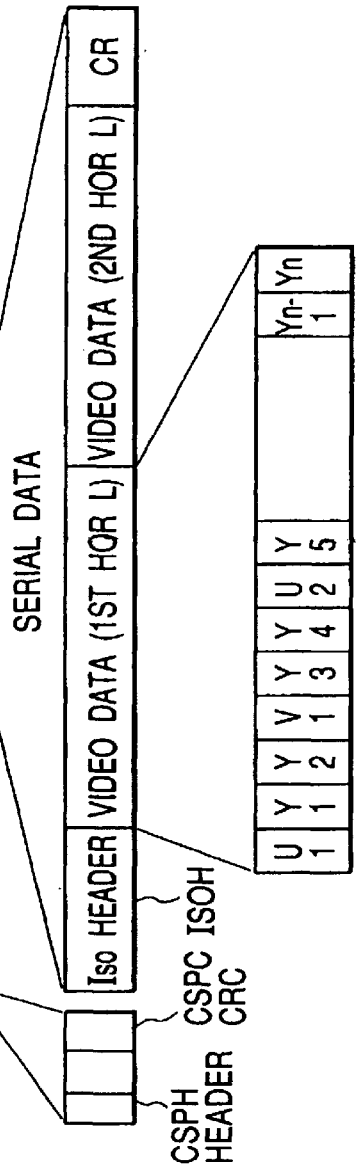
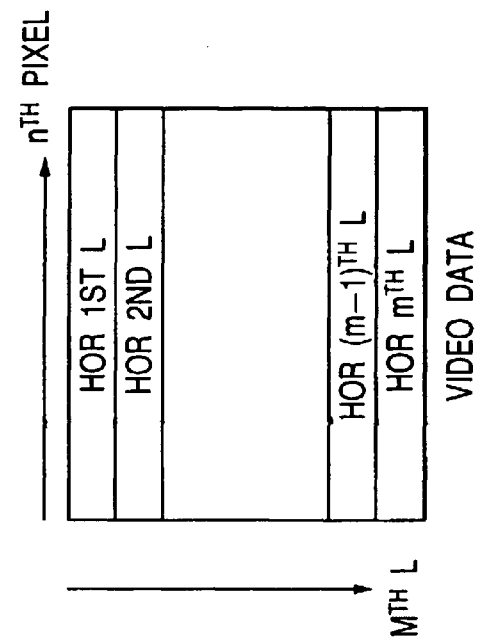
FIG. 2A
FIG. 2B
FIG. 2C
FIG. 2D

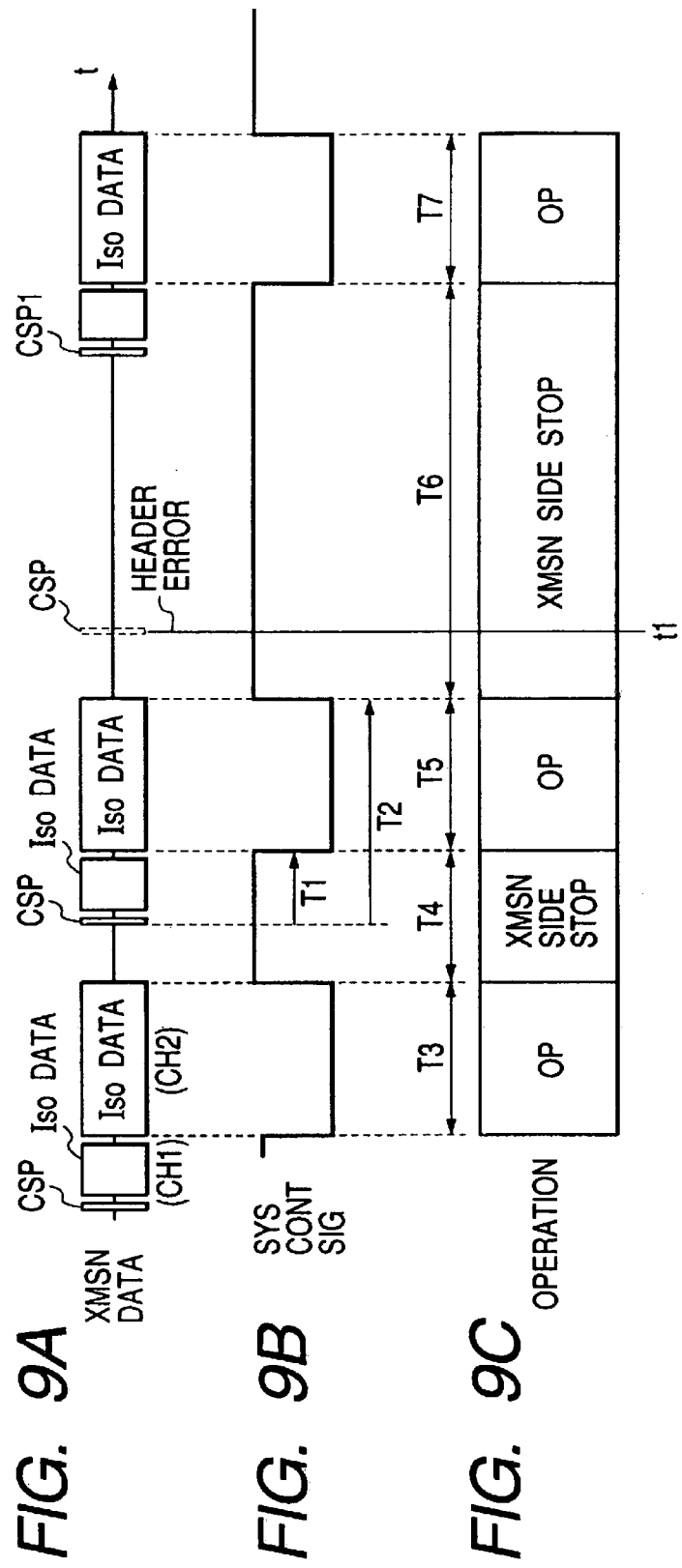

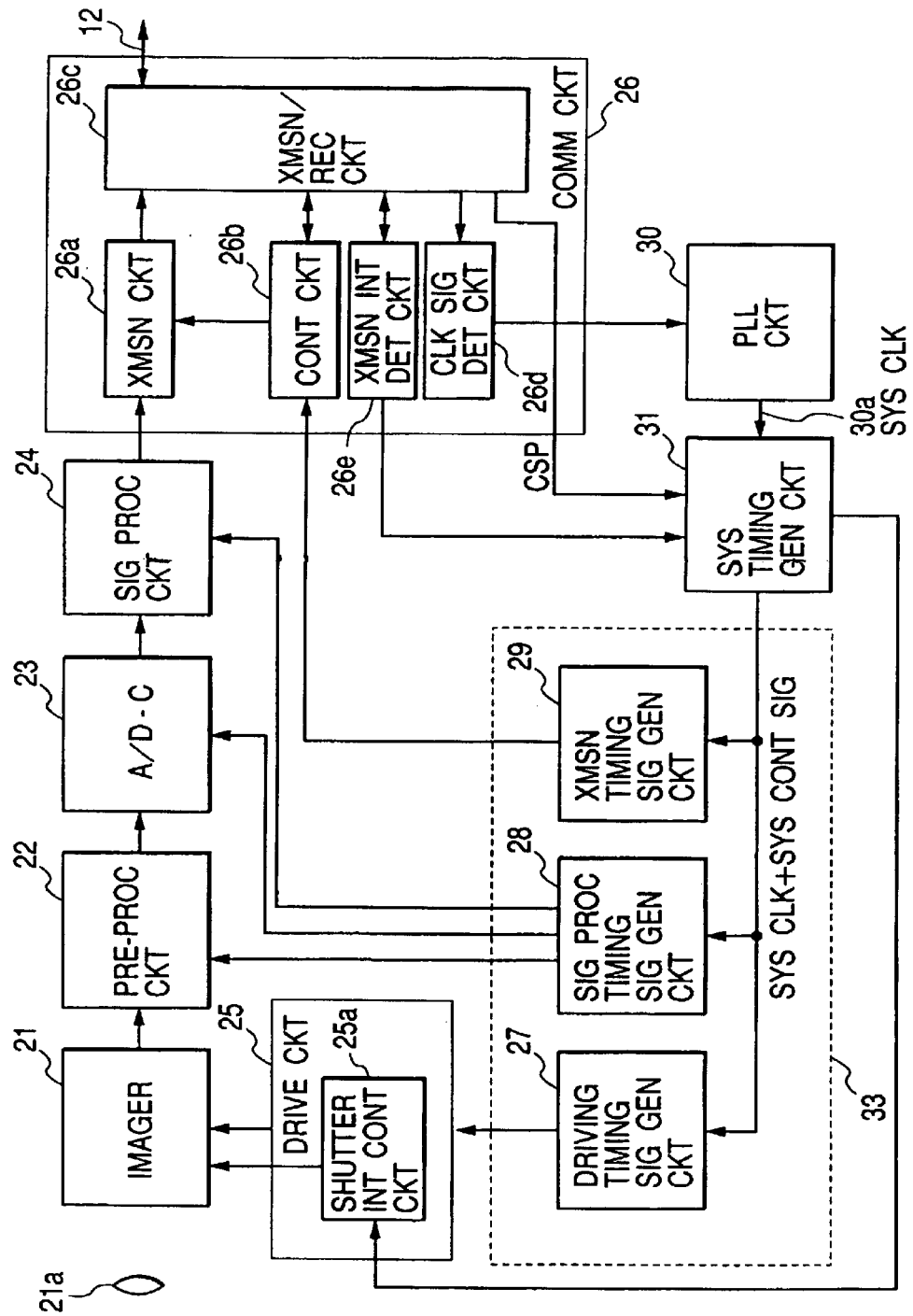

IMAGING APPARATUS WITH VIDEO DATA TRANSMISSION

BACKGROUND OF THE INVENTION

1. Field of the Invention

This invention relates to an imaging apparatus for receiving an image, generating video data from the image received by a camera, and transmitting the video data.

2. Description of the Prior Art

An imaging apparatus for receiving an image by a camera, generating video data from the received image, and transmitting the video data is known. In this prior art imaging apparatus, a clock signal is received by a transmitting and receiving circuit and the imager of the imaging apparatus is synchronously operated with the received clock signal. Such a prior art imaging apparatus is disclosed in Japanese patent application provisional publication No. 9-130655. FIG. 13 is a block diagram of a prior art imaging apparatus for receiving an image by a camera, generating video data from the received image, and transmitting the video data. The prior art imaging apparatus includes: an imager 101 for generating an image signal from the image formed by a lens 101a, a pre-processing circuit 102 for pre-processing the image signal, an a/d converter 103 for a/d-converting the image signal from the pre-processing circuit 102, a signal processing circuit 104 for processing the image signal from the a/d converter 104 to generate a digital video signal, a transmission/receiving circuit 106 for transmitting the digital video signal and extracting a clock signal from a serial signal, a PLL circuit 110 for frequency-multiplying the clock signal to generate another clock signal, a transmission/receiving timing generation circuit 109 for generating a timing signal for the transmission/receiving circuit 106, a signal processing timing generation circuit 108 for generating timing signals for the pre-processing circuit 102, the a/d converter 103, and the signal processing circuit 104, and a driving timing generation circuit 107 for generating a driving timing signal, and a driving circuit 105 for generating a driving signal for the imager 101 from the driving timing signal.

SUMMARY OF THE INVENTION

The aim of the present invention is to provide a superior imaging apparatus and to provide a superior imaging apparatus for continuously transmitting video data without noise or disturbance in the reproduced image though the communication cycle timing is not detected temporally.

According to the invention, there is provided a first imaging apparatus including: an imager; an optical unit for receiving and forming an image on the imager which generates an image signal from the image; an a/d converter for a/d-converting the image signal; a signal processing circuit for processing the image signal from the a/d converter to generate a digital video signal; a communication circuit for transmitting the digital video signal to a transmission line and receiving a clock signal and timing data transmitted through the transmission line, the timing data indicating a communication timing; a clock signal detection circuit for detecting the clock signal received by the communication circuit; a timing signal generation circuit for generating timing signals from the detected clock signal to control the imager, the a/d converter, the signal processing circuit, and the communication circuit; and a communication control circuit for detecting a communication timing from the timing data, judging whether the communication timing is detected within a predetermined condition, and controlling the timing signal generation circuit to stop transmitting the digital video signal when the communication timing is not detected within the predetermined condition.

In the first imaging apparatus, the communication circuit may receive a communication cycle header as the timing data and the communication control circuit detects an error in the communication cycle header from the transmitting and receiving circuit and judges that the communication timing is not received within the predetermined condition when the error is detected.

In the first imaging apparatus, the communication control circuit may control the timing signal generation circuit to stop operations of the imager, the a/d-converter, the signal processing circuit, and the communication circuit when the communication timing is not detected within the predetermined condition.

The first imaging apparatus may further include a shutter controlling circuit for controlling a shutter interval of the imager in accordance with the detected clock signal when the communication timing is detected within the predetermined condition and controlling the shutter interval of the imager in response to the detected error toward a predetermined shutter interval.

The first imaging apparatus may further include a storing circuit for storing the digital video signal, wherein the communication control circuit operates the storing circuit to store the digital video signal when the communication control circuit judges the communication timing is not detected within the predetermined condition and operates the storing circuit to read the digital video signal to supply the read digital video signal to the communication circuit when the communication control circuit judges the communication timing is detected again within the predetermined condition.

The first imaging apparatus may further include a display, wherein the communication control circuit operates the display to inform that the communication control circuit judges the communication timing is not detected within the predetermined condition.

According to this invention, there is provided a second imaging apparatus including: an imager; an optical unit for receiving and forming an image on the imager which generates an image signal from the image; an a/d converter for a/d-converting the image signal, a signal processing circuit for processing the image signal from the a/d converter to generate a digital video signal; a communication circuit for transmitting the digital video signal to an external communication apparatus transmitting the timing data indicative of a communication cycle and receiving the timing data from the external communication apparatus; a clock signal detection circuit for detecting a clock signal received by the communication circuit; a timing signal generation circuit for generating timing signals from the detected clock signal to control the imager, the a/d converter, the signal processing circuit, and the communication circuit; and a data transmission interval signal generation circuit for detecting a communication timing from the timing data and generating a transmitting interval signal indicative of a transmitting interval and a transmitting stop interval, wherein the communication circuit transmits the digital video signal only for the transmitting interval.

In the second imaging apparatus, the data transmission interval signal generation circuit detects transmission data rate data and channel data from the transmitting and receiving circuit to generate the transmitting interval signal.

In the second imaging apparatus, wherein the timing signal generation circuit stops generating the timing signals to stop operations of the imager, the a/d-converter, the signal processing circuit, and the transmitting circuit.

The second imaging apparatus may further includes a shutter interval control circuit for controlling a shutter interval of the imager toward a predetermined interval during the transmitting stop interval.

The second imaging apparatus may further include a memory responsive to the transmission interval signal for storing the digital video signal for the transmission stop interval and reading and supplying the read digital video signal to the communication circuit to transmit the read digital video signal for the transmission interval.

The second imaging apparatus may further include a further comprising a display for informing that it is during the transmission stop interval.

In the first imaging apparatus, the communication control circuit detects an error in the communication circuit, and controls the timing signal generation circuit to stop transmitting the digital video signal in the presence of the error.

In this case, the communication control circuit judges whether the clock signal is detected within a reference condition to detect the error, and controls the timing signal generation circuit to stop transmitting the digital video signal in the presence of the error.

In this case, the communication control circuit detects a communication timing from the timing data, judges whether the communication timing is detected within a predetermined condition to detect the error, and controls the timing signal generation circuit to stop transmitting the digital video signal in the presence of the error.

BRIEF DESCRIPTION OF THE DRAWINGS

The object and features of the present invention will become more readily apparent from the following detailed description taken in connection with the accompanying drawings in which:

FIGS. 2A to 2D are illustrations of data arrangement according to the first embodiment;

FIGS. 9A to 9C are timing charts of the fifth embodiment which are also referred in the seventh embodiment;

FIG. 11 is a block diagram of the imaging apparatus of a sixth embodiment;

The same or corresponding elements or parts are designated with like references throughout the drawings.

DETAILED DESCRIPTION OF THE INVENTION

First Embodiment

Figure 1:
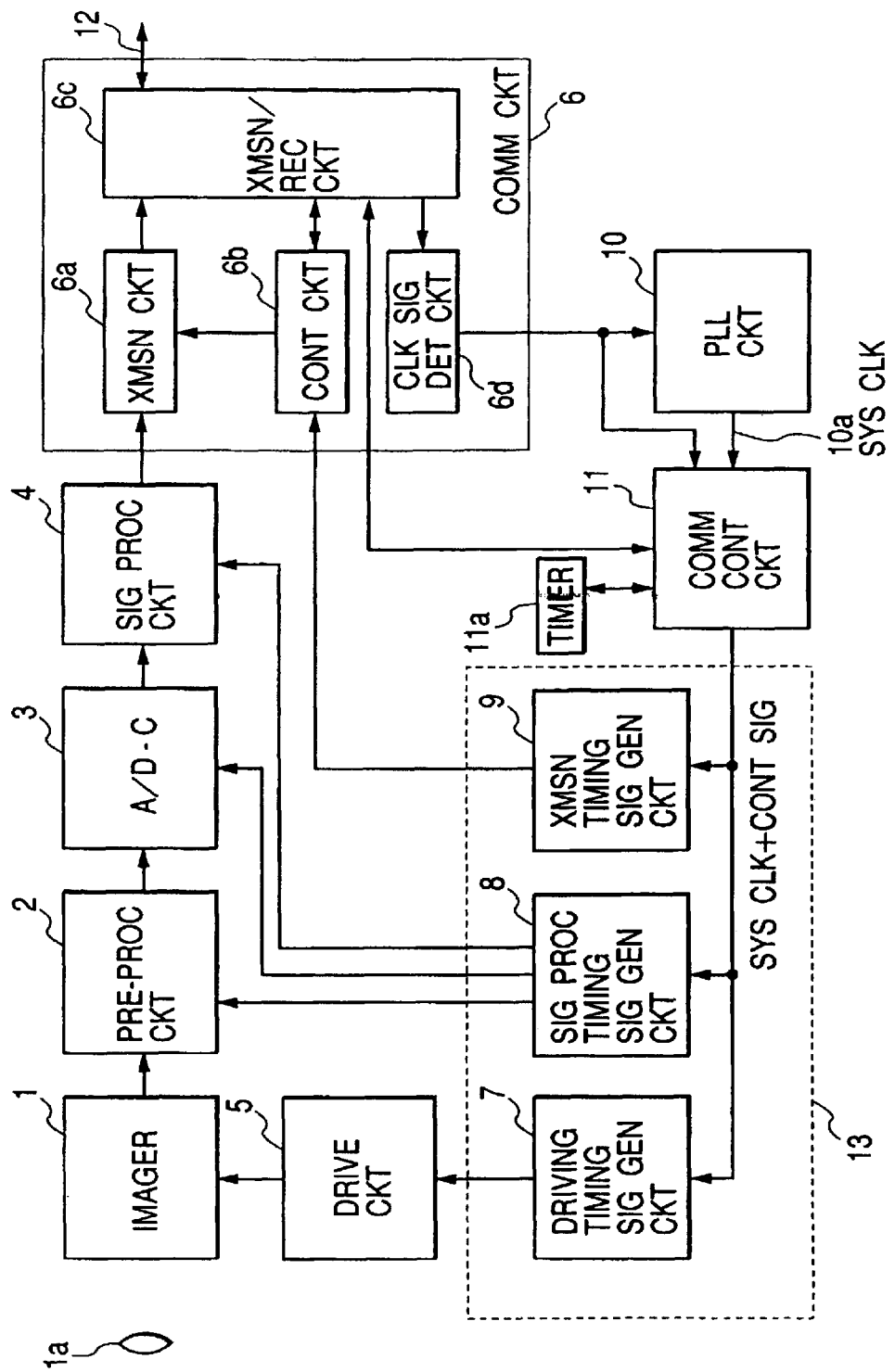
FIG. 1 is a block diagram of an imaging apparatus with video data transmission according to a first embodiment.

FIG. 1 is a block diagram of an imaging apparatus with video data transmission according to a first embodiment.

The imaging apparatus of the first embodiment includes: an imager 1, an optical lens 1a for receiving and forming an image on the imager 1 which generates an image signal from the image, a pre-processing circuit 2 for pre-processing the image signal, an a/d converter 3 for a/d-converting the image signal from the pre-processing circuit 2, a signal processing circuit 4 for processing the image signal from the a/d converter 4 to generate a digital video signal, a communication circuit 6 for transmitting the digital video signal to a transmission line 12 with a transmission circuit 6a and a transmission/receiving circuit 6c. Moreover, the communication circuit 6 receives a clock signal, a cycle start packet (timing data), and control data transmitted through the transmission line 12 with the transmission/receiving circuit 6c, a clock signal detection circuit 6d, and a control circuit 6b.

The imaging apparatus further includes a PLL (phase-locked loop) circuit 10 for frequency-multiplying the clock signal from the clock signal detecting circuit 6d to generate a system clock signal 10a, a timing signal generation circuit 13 for generating timing signals from the system clock signal to control the imager 1, the pre-processing circuit 2, the a/d converter 3, the signal processing circuit 4, and the communication circuit 6, and a communication control circuit 11 responsive to clock signal from the clock signal detection circuit 6 and the system clock signal 10a for detecting the header from the transmission/receiving circuit 6c to detect a communication timing from the header, judging whether the communication timing is correctly detected, that is, the communication timing is detected within a predetermined condition, and controlling the timing signal generation circuit 13 to stop transmitting the digital video signal when the communication timing is not detected within the predetermined condition.

The communication control circuit 11 is further responsive to a timer 11a for judging whether the communication timing is detected within the predetermined condition. That is, the communication control circuit 11 judges the communication timing becomes within a predetermined interval from the previous communication timing with the timer 11a.

The timing data indicates a communication timing and a communication cycle. The clock signal detection circuit 6d detects the clock signal received by the transmission/receiving circuit 6c.

Operation of the imaging apparatus will be described with assumption that a transmission method according to IEEE1394 is used.

Figure 3:
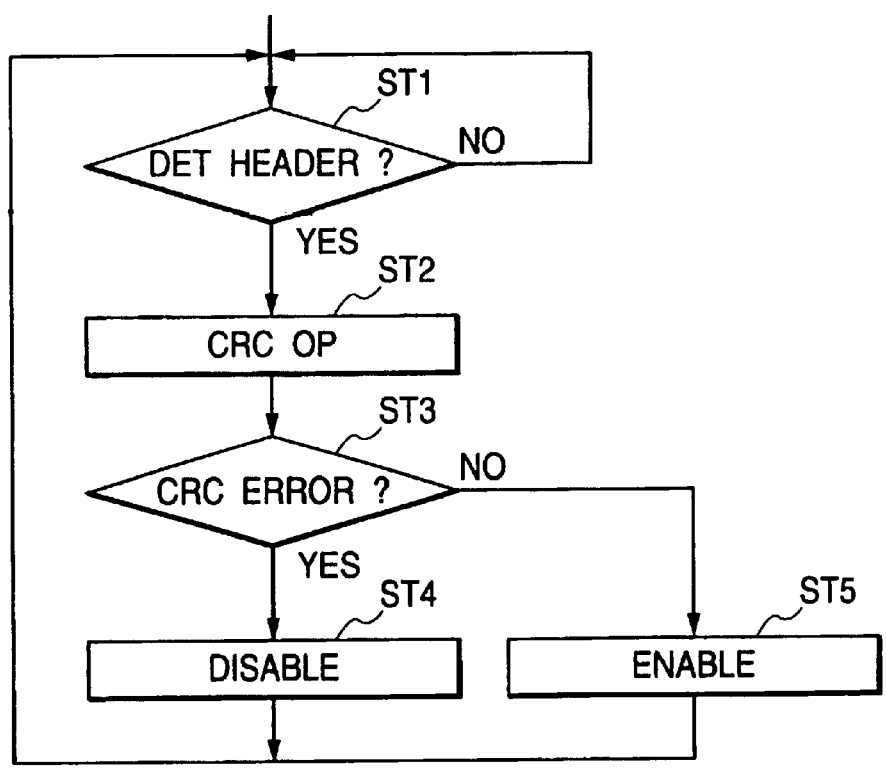
FIG. 3 depicts a flow chart of the first embodiment showing the operation of the communication control circuit shown in FIG. 1.

FIGS. 2A to 2D are illustrations of data arrangement according to the first embodiment. FIG. 3 depicts a flow chart of the first embodiment showing the operation of the communication control circuit 11.

The optical lens 1a receives and forms an image on the imager 1 which generates the image signal from the image.

The pre-processing circuit 2 pre-processing the image signal. For example, the pre-processing circuit 2 effects the correlation double sampling, the automatic gain controlling, etc. The a/d converter 3 a/d-converts the image signal from the pre-processing circuit 2 to output a digital image signal. The signal processing circuit 4 processes the digital image signal from the a/d converter 4 to generate a digital video signal including a luminance signal Y, color difference signals U and V and effects video signal processes including the white balance adjustment, the gamma processing, etc. to output the digital video signal. More specifically, the imager 1 supplies the image signal every pixel to the transmission circuit 6a through the pre-processing circuit 2, the a/d converter 3, the signal processing circuit 4 in response to the timing signals from the driving timing signal generation circuit 7, and the signal processing timing signal generation circuit 8.

In FIG. 2A, a cycle start packet CSP is transmitted from the transmission line 12. Following to the cycle start packet CSP, a first channel (CH1) of data is transmitted. Following to the first channel (CH1) of data, a second channel (CH2) of isochronous data is transmitted from this imaging apparatus.

In FIGS. 2B and 2C, it is assumed that luminance data Y, the color difference data U, and the color difference data V are transmitted at a ratio of 4:1:1. The transmission circuit 6a generates a serial data train including an isochronous header ISOH at the beginning of the serial data train, the video data of a first horizontal line and the video data of second horizontal line, and error check code CR at the end of the serial data train in response to every cycle start packet CSP transmitted by a cycle master apparatus (not shown) coupled to the transmission line 12 as shown in FIG. 2B. Each line of the video data includes video data of U1, Y1, Y2, V1, Y3, Y4, U2 to Yn as shown in FIG. 2C. That is, one pieces of each color differential data U and V are transmitted every four pieces of luminance data. Two horizontal lines of video data (FIG. 2D) is transmitted in one slot of the second channel CH2.

The cycle start packet CSP includes a header and CRC data of the header as shown in FIG. 2B.

The driving timing signal generation circuit 7, the signal processing timing signal generation circuit 8, and the transmission timing signal generation circuit 9 controls the transmission timing of respective driving circuit 5, the pre-processing circuit 2, the a/d converter 3, the signal processing circuit 4, and the communication circuit 6 in response to the system clock 10a generated by the PLL circuit 10 or a clock generated by a crystal oscillator (not shown) provided in the imager 1. The communication control circuit 11 controls the driving timing signal generation circuit 7, the signal processing timing signal generation circuit 8, and the transmission timing signal generation circuit 9 when an error occurs in communication cycle timing. That is, when an error occurs in communication cycle timing, the communication control circuit 11 stops supplying the system clock 10a to the timing signal generation circuit 13 or supplying the system clock 10a but disables the driving timing signal generation circuit 7, the signal processing timing signal generation circuit 8, and transmission timing signal generation circuit 9. Moreover, it is also possible that the communication control circuit 11 directly controls the imager 1, the pre-processing circuit 2, the a/d converter 3, the signal processing circuit 4, and the transmission circuit 6a to stop their operations when the error in the communication cycle.

The transmission/receiving circuit 6c receives a multiplexed clock signal and a cycle start packet CSP transmitted through the transmission line 12. The clock signal detection circuit 6d detects the multiplexed clock signal transmitted through the transmission line 12 and generates a system clock 10a.

FIG. 3 depicts a flow chart of the first embodiment showing operation of the communication control circuit 11.

The communication control circuit 11 detects the header CSPH of the cycle start packet CSP (communication cycle header) received by the transmission/receiving circuit 6c in step ST1. In the following step ST2, the communication control circuit 11 effects the CRC (cyclic redundancy check) operation to the data of the header and compares the result of the CRC operation with the CRC data added to the cycle start packet CSP to check whether there is a communication cycle error in step ST3. When there in no communication error in step ST3, that is, the communication control circuit 11 judges that the communication timing is detected within the predetermined condition, the communication control circuit 11 continues to supply the system clock 10a to the timing signal generation circuit 13 to enable operations of the imager 1, the pre-processing circuit 2, the a/d converter 3, the signal processing circuit 4, the transmission circuit 6a and the transmission portion of the transmission/receiving circuit 6c. If there is a communication cycle error, that is, the communication control circuit 11 judges that the communication timing is detected without the predetermined condition, the communication control circuit 11 stops supplying the system clock 10a to the timing signal generation circuit 13 to stop (disable) operations of the imager 1, the pre-processing circuit 2, the a/d converter 3, the signal processing circuit 4, the transmission circuit 6a and the transmission portion of the transmission/receiving circuit 6c in step ST4. When the following cycle start packet is received again without communication error in step ST3, the communication control circuit 11 starts to supply the system clock I0a (enable) to the timing signal generation circuit 13 to enable operations of the imager 1, the pre-processing circuit 2, the a/d converter 3, the signal processing circuit 4, the transmission circuit 6a and the transmission portion of the transmission/receiving circuit 6c.

The communication control circuit 11 obtains one of channels, for example, channel two CH2. Then, the communication control circuit 11 transmits the serial data including the isochronous header ISOH, consecutive two horizontal lines of the video data (video signal), and the error check code CR at the timing of the channel two CH2 which is a predetermined interval after the cycle start packet CSP.

The communication control circuit 11 is further detects the communication error. That is, the communication control circuit 11 is further responsive to a timer 11a for judging whether the cycle start packet CSP is detected within the predetermined interval from the previous cycle start packet with the timer 11a. Moreover, the communication control circuit 11 detects that the clock is not detected within the predetermined condition. That is, the communication control circuit 11 judges whether the clock signal is detected within a predetermined interval which is slightly longer than the clock cycle.

The cycle start packet (timing data) CSP indicates a communication timing of the obtained channel and the communication cycle.

Figures 4A, 4B:
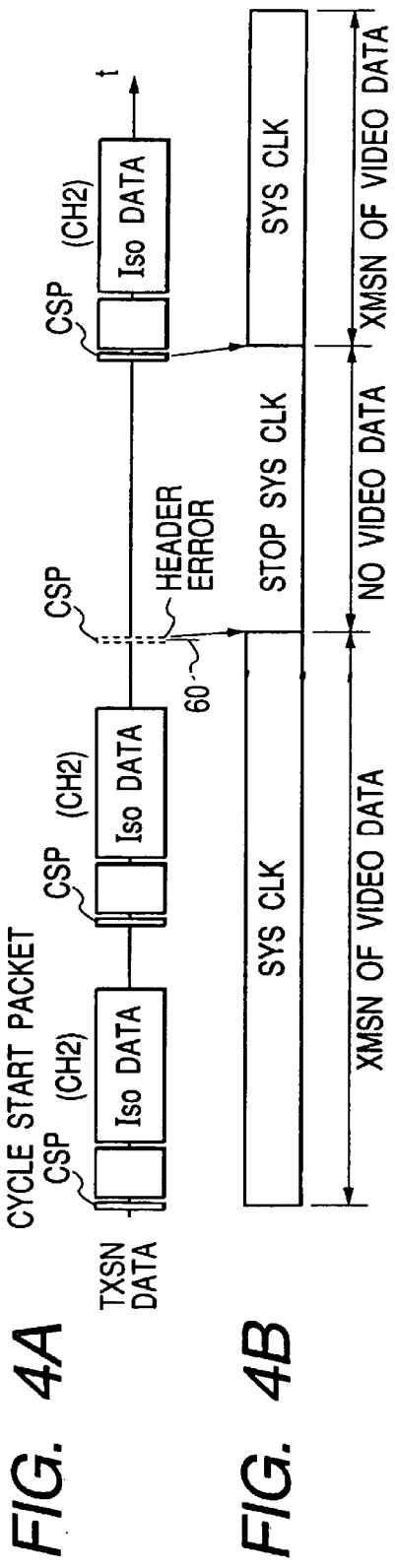
FIGS. 4A and 4B are time charts of this embodiment showing operation of the communication control circuit shown in FIG. 1.

FIGS. 4A and 4B are time charts of this embodiment showing the operation of the communication control circuit 11. When the communication error, that is, there is an error in the data in the header CSPH of the cycle start packet CSP at t0, the system clock from the communication control circuit 11 is stopped, so that no video data is transmitted. When the header CSPH of the cycle start packet CSP is correctly detected again, the system clock from the communication control circuit 11 is supplied again, so that video data (digital video signal) is transmitted.

Second Embodiment

Figure 5:
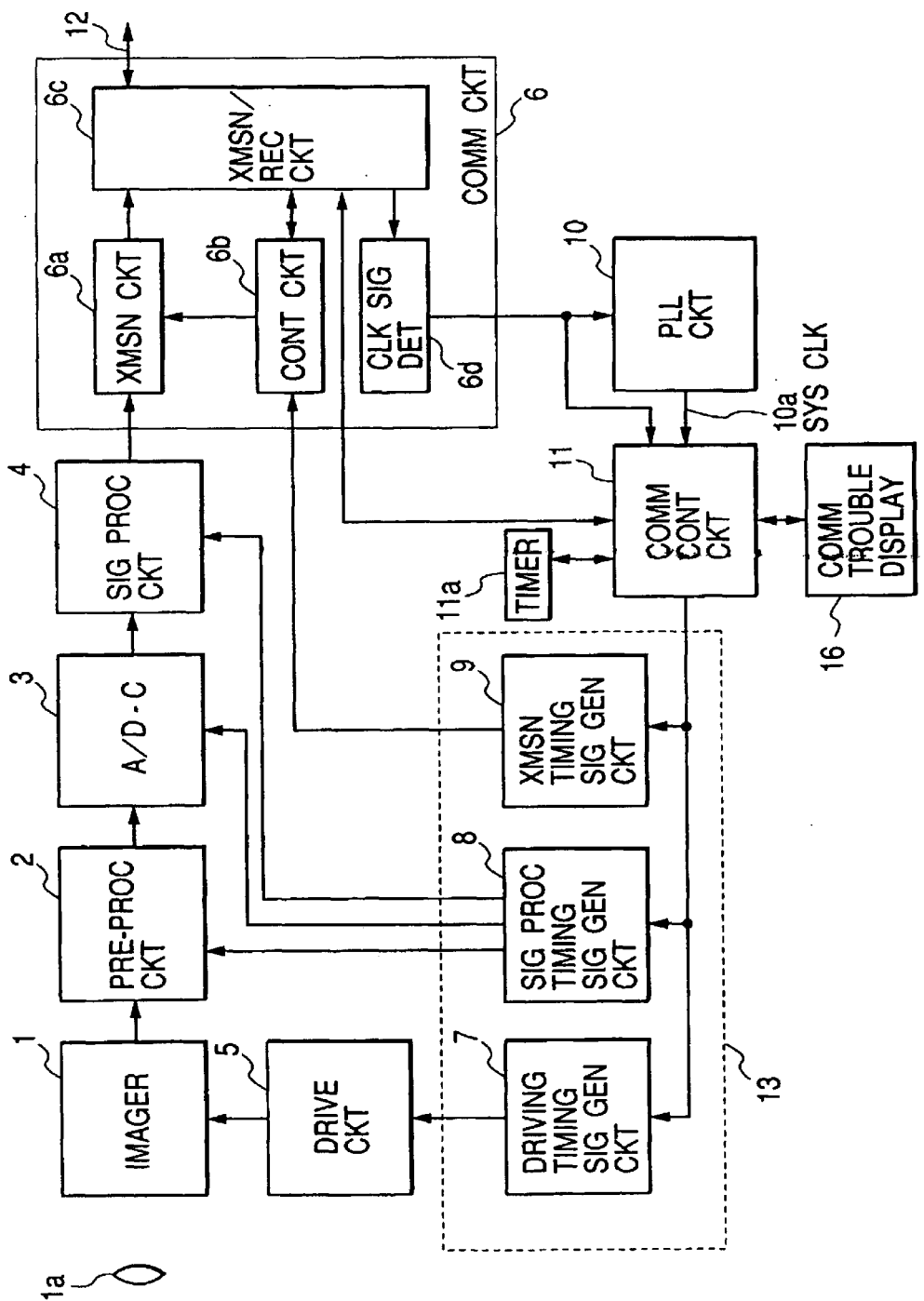
FIG. 5 is a block diagram of the imaging apparatus of a second embodiment.

FIG. 5 is a block diagram of the imaging apparatus of a second embodiment.

The structure of the imaging apparatus of the second embodiment is substantially the same as that of the first embodiment. The difference is that a communication trouble display 16 including an LED is further provided. When the communication control circuit 11 detects the communication error, the communication trouble display 16 display the occurrence of the communication error. Moreover, the communication control circuit 11 transmits the data of communication error to an external computer to check the communication quality.

Third Embodiment

Figure 6:
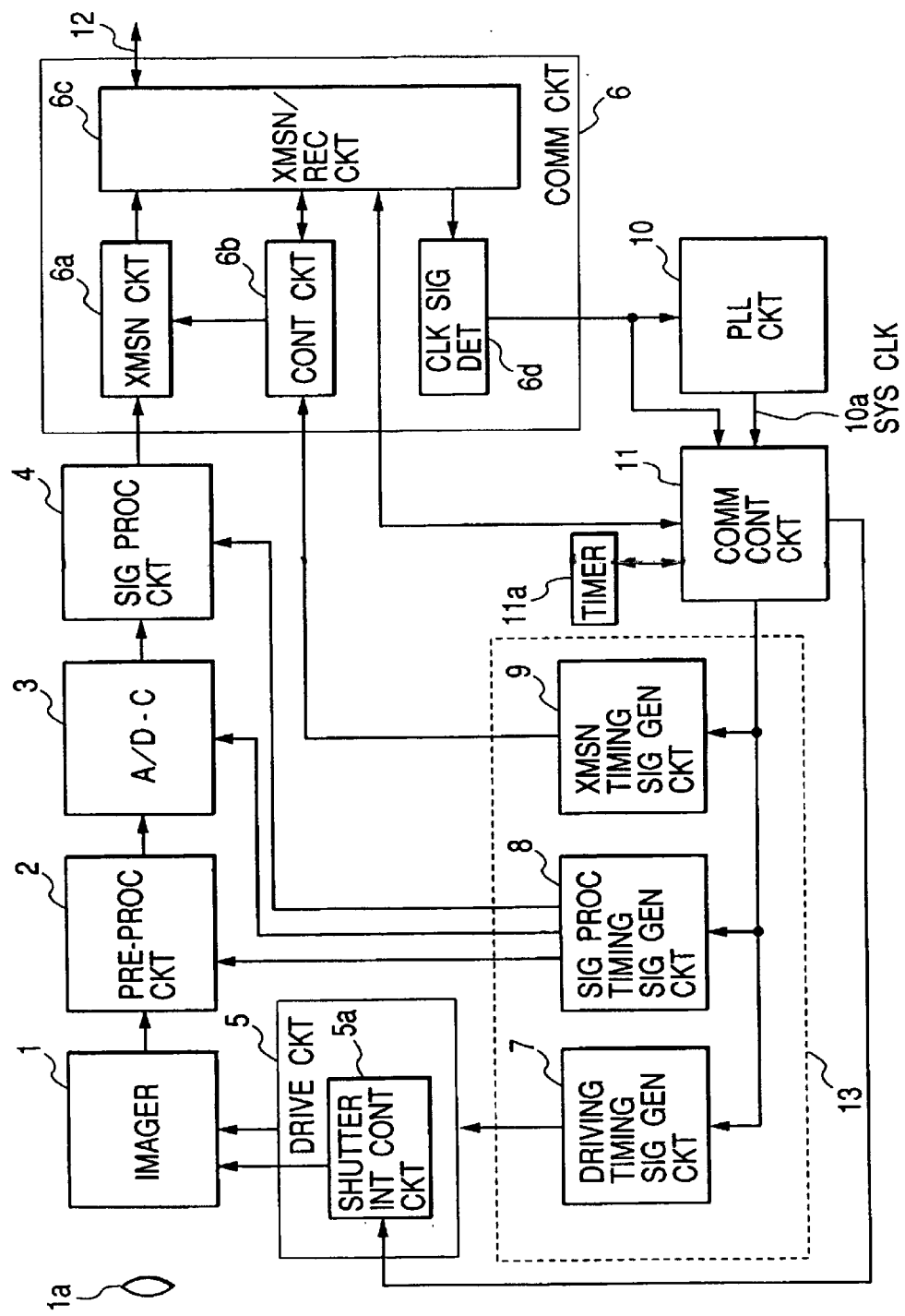
FIG. 6 is a block diagram of the imaging apparatus of a third embodiment.

FIG. 6 is a block diagram of the imaging apparatus of a third embodiment.

The structure of the imaging apparatus of the third embodiment is substantially the same as that of the first embodiment. The difference is that a shutter interval control circuit 5a is further provided.

If the communication error occurs, the shutter interval will be extended because the shutter interval is controlled in accordance with the number of pulses of the clock signals or the cycle start packet CSP. To prevent the extension of the shutter interval, when the communication control circuit 11 detects the communication error, the communication control circuit 11 operates the shutter interval control circuit 5a to control a shutter interval of the imager 1 toward a predetermined shutter interval. More specifically, when the communication error is detected because the clock signal cannot be detected, a count value of a counter (not shown) for counting pulses of the system clock 10a which is supplied from the PLL circuit 10 via the communication control circuit 11 is increased by a predetermined value or a set value to be compared with the count value in the counter may be decreased by a predetermined value to make the shutter interval constant. Moreover, it is also possible that in response to start of exposure, a timer (not shown) measures a predetermined interval and the shutter closing timing is determined in accordance with either the timer or the counter which becomes the shutter closing timing earlier to make the shutter interval constant.

Fourth Embodiment

Figure 7:
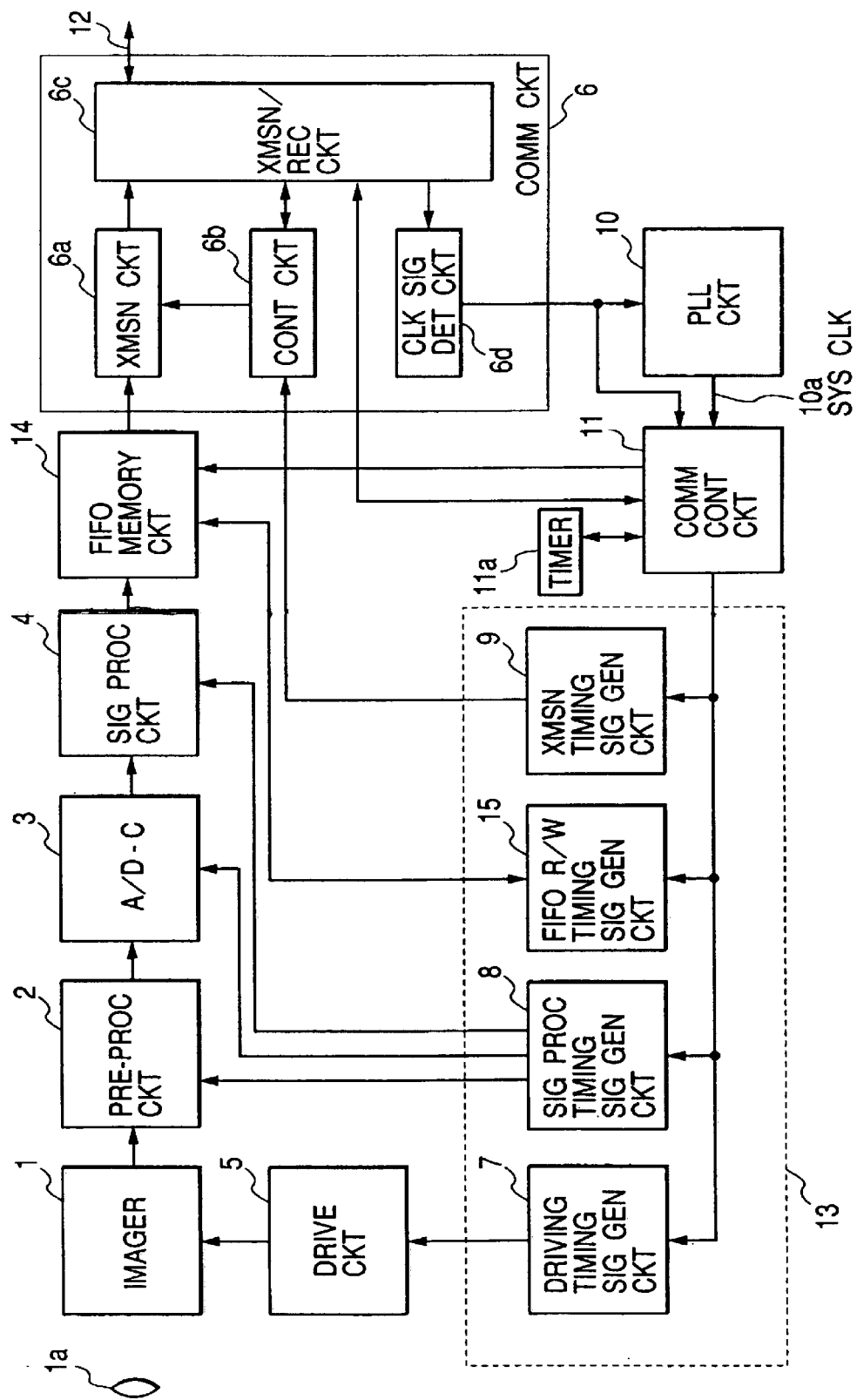
FIG. 7 is a block diagram of the imaging apparatus of a fourth embodiment.

FIG. 7 is a block diagram of the imaging apparatus of a fourth embodiment.

The structure of the imaging apparatus of the fourth embodiment is substantially the same as that of the first embodiment. The difference is that a FIFO (first-in first-out) memory circuit 14 and a FIFO reading/writing timing signal generation circuit 15 are further provided.

When there is no communication error, the digital video signal from the signal processing circuit 4 is immediately supplied to the transmission circuit 6a through through the FIFO memory circuit 14. On the other hand, when the communication error is detected, the communication control circuit 11 operates the FIFO reading/writing timing signal generation circuit 15 to temporally store the digital video signal from the signal processing circuit 4 and. When the communication error eliminates, the communication control circuit 11 operates the FIFO reading/writing timing signal generation circuit 15 to read the stored the digital video signal to supply the read digital video signal to the transmission circuit 6a to transmit the digital video signal to the transmission line 12.

As mentioned, if the communication error occurs, the imager 1, the pre-processing circuit 2, the a/d converter 3, the signal processing circuit 4, and the FIFO memory circuit 14 are continuously operated, so that the image represented by the digital video data is continuously transmitted.

If the communication error occurs because the clock signal cannot be detected by the clock signal detection circuit 6d, the PLL circuit 10 generates the system clock signal 10a at a lowest frequency, so that it is desirable that the shutter interval control circuit 5a mentioned in the third embodiment is provided.

Fifth Embodiment

Figure 8:
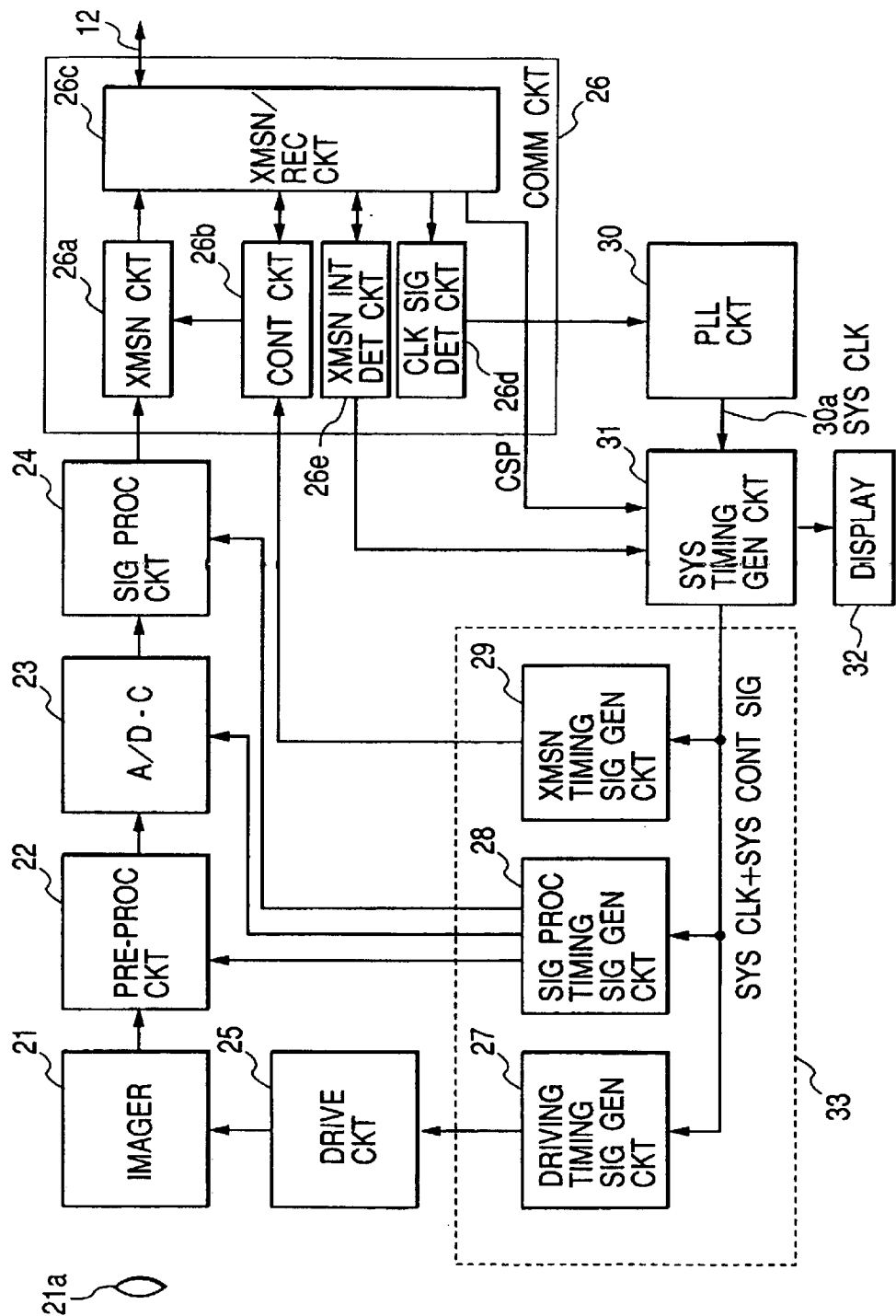
FIG. 8 is a block diagram of an imaging apparatus with video data transmission according to a fifth embodiment.

FIG. 8 is a block diagram of an imaging apparatus with video data transmission according to a fifth embodiment.

The imaging apparatus of the fifth embodiment includes: an imager 21, an optical lens 21a for receiving and forming an image on the imager 21 which generates an image signal from the image, a pre-processing circuit 22 for pre-processing the image signal, an a/d converter 23 for a/d-converting the image signal from the pre-processing circuit 22, a signal processing circuit 24 for processing the image signal from the a/d converter 24 to generate a digital video signal, a communication circuit 26 for transmitting the digital video signal to the transmission line 12 with a transmission circuit 26a and a transmission/receiving circuit 26c. Moreover, the communication circuit 26 receives a clock signal, a cycle start packet (communication timing data), and control data transmitted through the transmission line 12 with the transmission/receiving circuit 26c, a clock signal detection circuit 26d, a transmission interval determining circuit 26e, and a control circuit 26b.

The imaging apparatus further includes a PLL circuit 30 for frequency-multiplying the clock signal from the clock signal detecting circuit 26e to generate a system clock signal 30a, a system timing generation circuit 31 for generating a system control signal from the system clock signal to supply the system clock signal and the system control signal to the timing signal generation circuit 33.

The structure of the imaging apparatus of the fifth embodiment is substantially the same as that of the first embodiment. The difference is that the transmission interval determining circuit 26e is added and the communication control circuit 11 is replaced with the system timing generation circuit 31. A display 32 may be further provided. The timing signal generation circuit 33 includes a driving timing signal generation circuit 27 for the drive circuit 25 and the imager 21, a signal processing timing signal generation circuit 28 for the pre-processing circuit 22, the a/d converter 23, and the signal processing circuit 24, and a transmission timing signal generation circuit 29 for the communication circuit 26.

The basic operations of the imager 21, the pre-processing circuit 22, the a/d converter 23, the signal processing circuit 24, the communication circuit 26, and the timing signal generation circuit 33 are similar to those of the first embodiment. The difference is that the transmission interval determining circuit 26e obtains a data rate and obtains (right of) a channel of isochronous data and the system timing generation circuit 31 generates the system control signal indicative of a transmission interval.

Figure 10A:
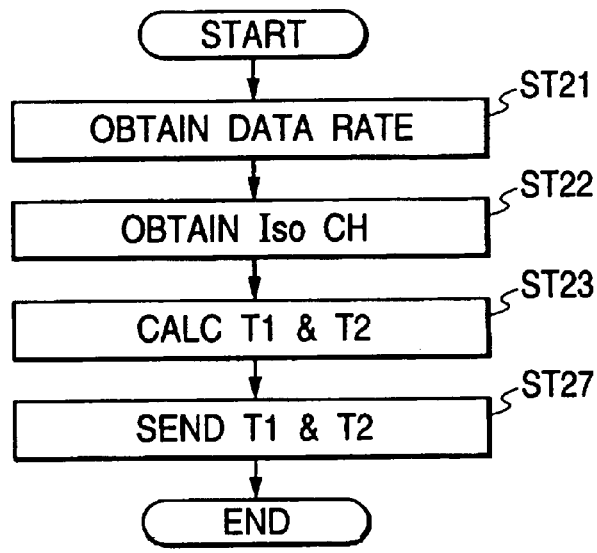
FIG. 10A depicts a flow chart of the transmission interval determining circuit shown in FIG. 8.
Figure 10B:
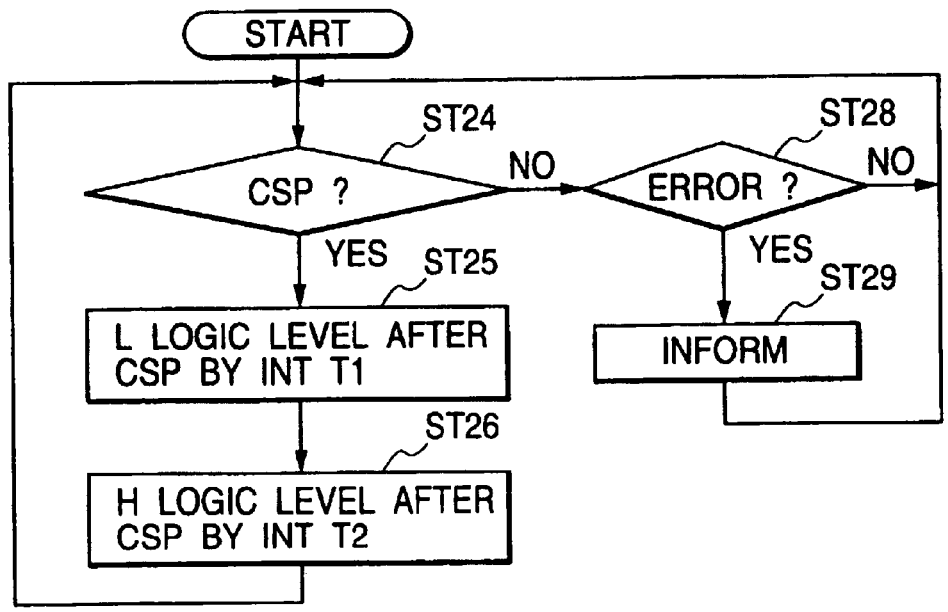
FIG. 10B depicts a flow chart of the system timing generation circuit shown in FIG. 8.

FIGS. 9A to 9C are timing charts of the fifth embodiment which are also referred in the seventh embodiment. FIG. 10A depicts a flow chart of the transmission interval determining circuit 26e and FIG. 10B depicts a flow chart of the system timing generation circuit 31.

The transmission interval determining circuit 26e detects the data rate, a communication start timing, a data 25 length of a packet from the transmission and receiving circuit 26c. More specifically, the transmission interval determining circuit 26c obtains the data rate in step ST21. In the following step ST22, the transmission interval determining circuit 26e obtains one of channels of isochronous data (obtains the right of one channel). Then, the transmission interval determining circuit 26e calculates intervals T1 and T2 in step ST23 and sends the data of intervals T1 and T2 to the system timing generation circuit 31 in step ST27.

The system timing generation circuit 31 generates the system control signal as follows:

In step ST24, the system timing generation circuit 31 checks whether the cycle start packet CSP is transmitted by checking the transmission/receiving circuit 26c. If there is a cycle start packet CSP is present, as shown in FIG. 9B, the system timing generation circuit 31 makes the logic level of the system control signal to L after the cycle start packet CSP by the interval T1 in step ST25 and then, after the cycle start packet CSP by the interval T2, the system timing generation circuit 31 makes the logic level of the system control signal to H in step ST26. The system timing generation circuit 31 supplies the system control signal and the system clock signal to the timing signal generation circuit 33.

As shown in FIG. 9A, it is assumed that the transmission interval determining circuit 26e obtains the channel CH2, the transmission interval determining circuit 26e calculates the interval TI from the cycle start packet CSP to the beginning of the channel CH2 and the transmission interval determining circuit 26e calculates the interval T2 from the data rate and the data length. Then, the timing signal generation circuit 31 generates the timing signals for intervals T3, T5, and T7. On the other hand, for the interval T4, the timing signal generation circuit 31 does not generates the timing signals for the imager 21, the pre-processing circuit 22, the a/d converter 23, the signal processing circuit 24, and the transmission circuit 26a but the system timing generation circuit 31 continuously monitors the cycle start packet for the interval T4 in step ST28. When a cycle header error occurs, that is, the cycle start packet CSP cannot be detected or a data error occurs in the header of the cycle start packet CSP at t1, the system control signal remains H logic level until the next cycle start packet CSP1 as shown in FIG. 9B.

As mentioned, the operations of the imager 21, the pre-processing circuit 22, the a/d converter 23, the signal processing circuit, and the transmission circuit 26a are stopped and effected only for the transmission interval, so that the video data is transmitted only for the transmission intervals as shown in FIG. 9C. Accordingly, a power consumption is reduced and undesired electromagnetic emission is suppressed.

The transmission stop interval may be informed by the display 32 in step ST29.

Sixth Embodiment

FIG. 11 is a block diagram of the imaging apparatus of a sixth embodiment.

The structure of the imaging apparatus of the sixth embodiment is substantially the same as that of the fifth embodiment. The difference is that a shutter control circuit 25a is further provided.

If the communication error occurs, the shutter interval will be extended because the shutter interval is controlled in accordance with the number of pulses of the clock signals or the cycle start packet. To prevent the extension of the shutter interval, when the system timing generation circuit 31 detects the communication error, the communication control circuit 11 operates the shutter control circuit 25a to control a shutter interval of the imager 1 toward a predetermined shutter interval. More specifically, when the communication error is detected because the clock signal cannot be detected, a count value of a counter (not shown) in the shutter interval control circuit 25a for counting pulses of the system clock 30a from the system timing generation circuit 31 may be increased by a predetermined value to make the shutter interval constant. Moreover, it is also possible that a set value to the counter to be compared with the count value in the counter may be decreased by a predetermined value to make the shutter interval constant. Moreover, it is also possible that in response to start of exposure, a timer (not shown) in the shutter interval control circuit 25a measures a predetermined interval and the shutter closing timing is determined in accordance with either the timer or the counter which becomes the shutter closing timing earlier to make the shutter interval constant.

Seventh Embodiment

Figure 12:
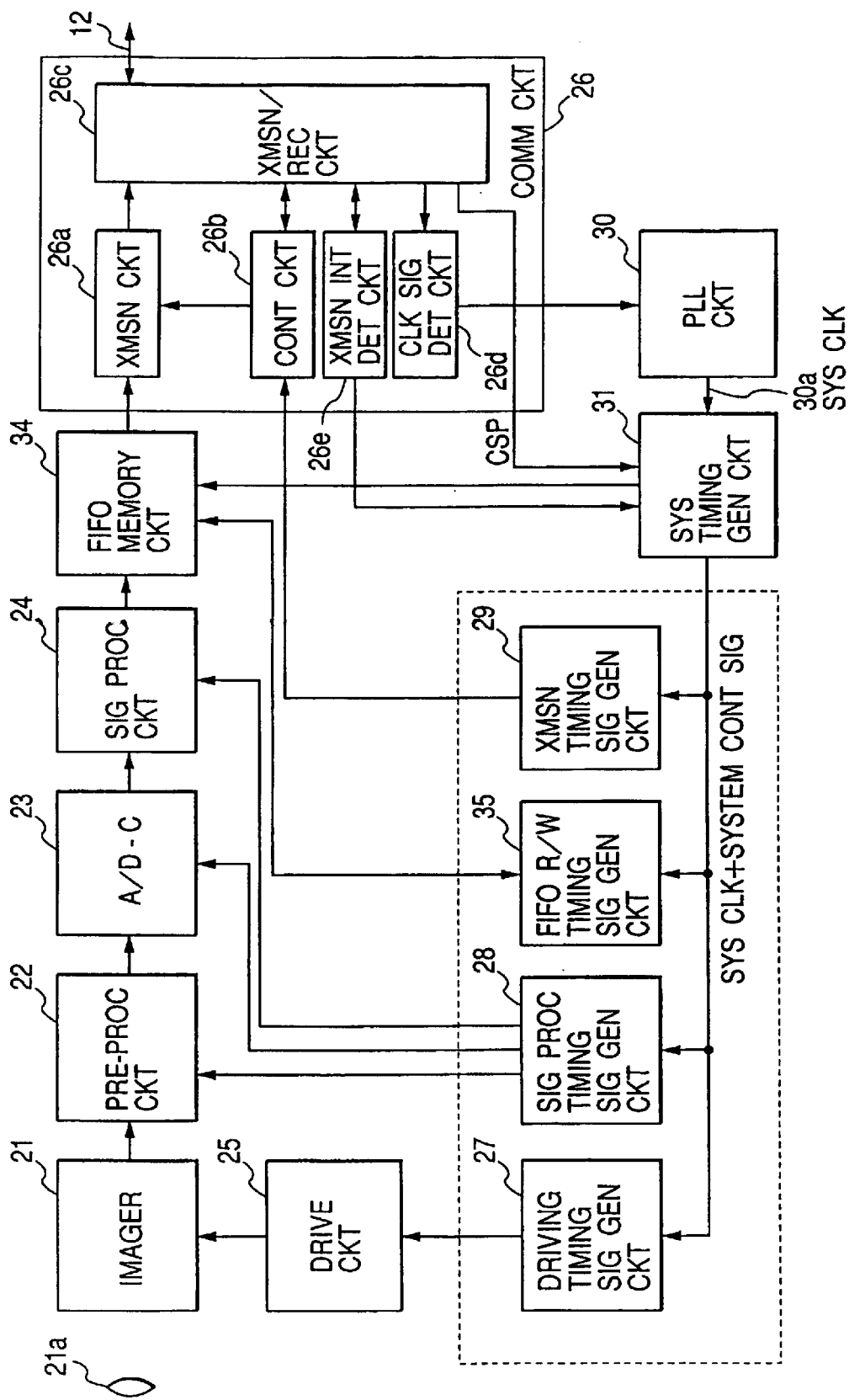
FIG. 12 is a block diagram of the imaging apparatus of a seventh embodiment.
Figure 13:
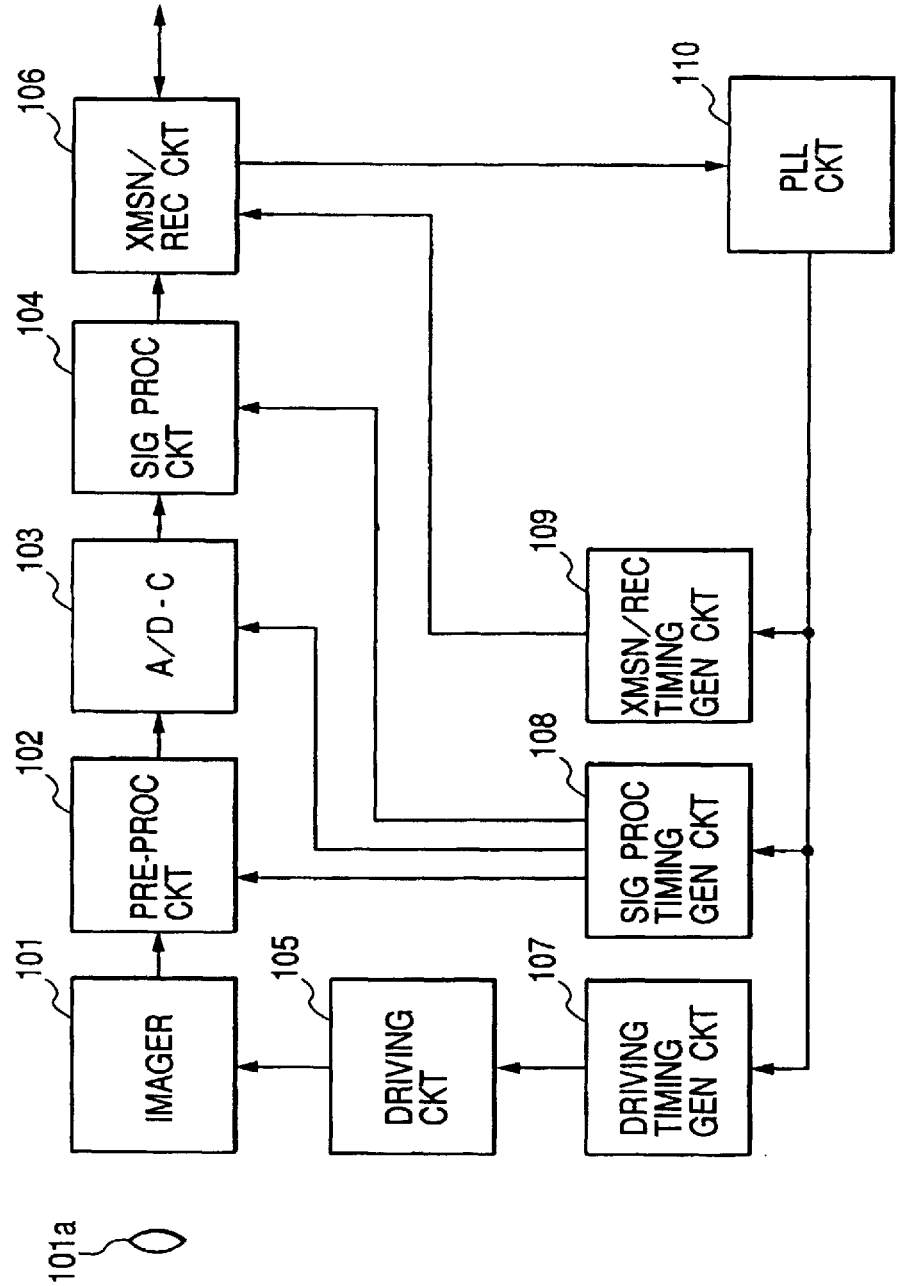
FIG. 13 is a block diagram of a prior art imaging apparatus.

FIG. 12 is a block diagram of the imaging apparatus of a seventh embodiment.

The structure of the imaging apparatus of the seventh embodiment is substantially the same as that of the fifth embodiment. The difference is that a FIFO memory circuit 34 and a FIFO reading/writing timing signal generation circuit 35 are further provided.

When there is no communication error, the digital video signal from the signal processing circuit 24 is immediately supplied to the transmission circuit 26a through the FIFO memory circuit 34 during the transmission intervals. On the other hand, during transmission stop intervals, the system timing generation circuit 31 operates the FIFO reading/writing timing signal generation circuit 35 to temporally store the digital video signal from the signal processing circuit 24. If a communication error occurs during transmission stop interval and then, the communication error eliminates, the system timing generation circuit 31 operates the FIFO reading/writing timing signal generation circuit 35 to read the stored the digital video signal to supply the read digital video signal to the transmission circuit 26a to transmit the digital video signal to the transmission line 12.

As mentioned, if the communication error occurs at t1 as shown in FIG. 9A, the imager 21, the pre-processing circuit 22, the a/d converter 23, the signal processing circuit 24, and the FIFO memory circuit 34 are operated, so that the image represented by the digital video data is temporally stored and transmitted in response to detection of the next cycle start packet CSP1 as shown in FIG. 9A.

If the communication error occurs because the clock signal cannot be detected by the clock signal detection circuit 6d, the PLL circuit 10 generates the system clock signal 10a at a lowest frequency, so that it is desirable that the shutter interval control circuit 5a mentioned in the sixth embodiment is provided.

As mentioned, transmission of video data is stopped when the timing data is not detected from the transmission line 12 or a transmission error occurs, so that it is possible to prevent generation of noise or disturbance in the reproduced image. Moreover, the system control signal indicating the transmission interval is generated from the data rate from the transmission line and the obtained channel, so that the video data is transmitted only for the transmission possible interval, so that a power consumption is reduced and undesired electromagnetic emission is suppressed.

What is claimed is:

1. An imaging apparatus comprising:

imaging means (1, 5);

optical means (1a) for receiving and forming an image on said imaging means which generates an image signal from said image;

a/d converting means (3) for a/d-converting said image signal;

signal processing means (4) for processing said image signal from said a/d converting means to generate a digital video signal;

communication means (6) for transmitting said digital video signal to a transmission line and receiving a clock signal and timing data transmitted through said transmission line, said timing data indicating a communication timing;

clock signal detection means (6d) for detecting said clock signal received by said communication means;

timing signal generation means (7-10) for generating timing signals from said detected clock signal to control said imaging means, said a/d converting means, said signal processing means, and said communication means; and communication control means (11) for detecting a communication timing from said timing data, judging whether said communication timing is detected within a predetermined condition, and controlling said timing signal generation means to stop transmitting said digital video signal when said communication timing is not detected within said predetermined condition.

2. An imaging apparatus as claimed in claim 1, wherein said communication means receives a communication cycle header as said timing data and said communication control means detects an error in said communication cycle header from said communication means and judges that said communication timing is not received within said predetermined condition when said error is detected.

3. An imaging apparatus as claimed in claim 1, wherein said communication control means controls said timing signal generation means to stop operations of said imaging means, said a/d converting means, said signal processing means, and said communication means when said communication timing is not detected within said predetermined condition.

4. An imaging apparatus as claimed in claim 1, further comprising shutter controlling means for controlling a shutter interval of said imaging means in accordance with said detected clock signal when said communication timing is detected within said predetermined condition and controlling said shutter interval of said imaging means toward a predetermined shutter interval when said communication control means detects an error.

5. An imaging apparatus as claimed in claim 1, further comprising storing means for storing said digital video signal, wherein said communication control means operates said storing means to read said digital video signal to supply said digital video signal from said storing means to said communication means when said communication control means judges that the communication timing is not detected within the predetermined condition and then, judges that said communication timing is received again within said predetermined condition.

6. An imaging apparatus as claimed in claim 1, further comprising display means, wherein said communication control means operates said display means to inform that said communication control means judges said communication timing is not received within said predetermined condition.

7. An imaging apparatus as claimed in claim 1, wherein said communication control means detects an error in said communication means, and controls said timing signal generation means to stop transmitting said digital video signal in the presence of said error.

8. An imaging apparatus as claimed in claim 7, wherein said communication control means judges whether said clock signal is detected within a reference condition to detect said error, and controls said timing signal generation means to stop transmitting said digital video signal in the presence of said error.

9. An imaging apparatus as claimed in claim 7, wherein said communication control means detects a communication timing from said timing data, judging whether said communication timing is detected within a predetermined condition to detect said error, and controlling said timing signal generation means to stop transmitting said digital video signal in the presence of said error.

10. An imaging apparatus comprising:

imaging means (1);

optical means (1a) for receiving and forming an image on said imaging means which generates an image signal from said image;

a/d converting means (3) for a/d-converting said image signal;

signal processing means (4) for processing said image signal from said a/d converting means to generate a digital video signal;

communication means (6) for transmitting said digital video signal to a transmission line which transmits timing data indicative of a communication cycle and a clock signal, said communication means receiving said timing data and said clock signal;

clock signal detection means (6d) for detecting said clock signal received by said communication means;

timing signal generation means (7-10) for generating timing signals from said detected clock signal to control said imaging means, said a/d converting means, said signal processing means, and said communication means; and data transmission interval signal generation means for detecting a communication timing from said timing data and generating a transmitting interval signal indicative of a transmitting interval and a transmitting stop interval, wherein said communication means transmits said digital video signal only for said transmitting interval.

11. An imaging apparatus as claimed in claim 10, wherein said data transmission interval signal generation means detects transmission data rate data and channel data from said communication means to generate said transmitting interval signal.

12. An imaging apparatus as claimed in claim 10, wherein said timing signal generation means stops generating said timing signals to stop operations of said imaging means, said a/d converting means, said signal processing means, and said communication means during said transmitting stop interval.

13. An imaging apparatus as claimed in claim 10, further comprising shutter interval control means for controlling a shutter interval of said imaging means toward a predetermined interval during said transmitting stop interval.

14. An imaging apparatus as claimed in claim 10, further comprising storing means responsive to said transmitting interval signal for storing said digital video signal for said transmitting stop interval and reading and supplying said digital video signal to said communication means for said transmitting interval.

15. An imaging apparatus as claimed in claim 10, further comprising display means for informing that it is during said transmitting stop interval.

* * * * *